United States Patent
Rao et al.

(10) Patent No.: US 11,874,657 B2
(45) Date of Patent: Jan. 16, 2024

(54) UNMANNED AERIAL VEHICLE CONTROL SYSTEM AND UNMANNED AERIAL VEHICLE CONTROL METHOD

(71) Applicant: Far EasTone Telecommunications Co., Ltd., Taipei (TW)

(72) Inventors: Herman Chunghwa Rao, Taipei (TW); Chen-Tsan Yu, Taipei (TW); Hua-Pei Chiang, Taipei (TW); Chien-Peng Ho, Taipei (TW); Chyi-Dar Jang, Taipei (TW); Yao-Ming Chang, Taipei (TW); Che-Yu Liao, Taipei (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 95 days.

(21) Appl. No.: 17/327,758

(22) Filed: May 23, 2021

(65) Prior Publication Data

US 2022/0066445 A1 Mar. 3, 2022

(30) Foreign Application Priority Data

Aug. 25, 2020 (TW) ................................. 109128907

(51) Int. Cl.
*G05D 1/00* (2006.01)
*G08G 5/00* (2006.01)
*B64C 39/02* (2023.01)
*B64U 101/00* (2023.01)

(52) U.S. Cl.
CPC ......... *G05D 1/0022* (2013.01); *B64C 39/024* (2013.01); *G05D 1/0027* (2013.01); *G08G 5/003* (2013.01); *G08G 5/0013* (2013.01); *B64U 2101/00* (2023.01)

(58) Field of Classification Search
None
See application file for complete search history.

(56) References Cited

U.S. PATENT DOCUMENTS

| 10,255,817 | B2 | 4/2019 | Sharma et al. |
| 10,327,151 | B2 | 6/2019 | Priest et al. |
| 10,348,394 | B1 | 7/2019 | Bakr et al. |
| 10,810,893 | B2 * | 10/2020 | Yoshizawa ............ H04W 4/027 |

(Continued)

FOREIGN PATENT DOCUMENTS

| CN | 108646780 | 10/2018 | |
| EP | 3296977 A1 * | 3/2018 | ......... B64D 45/0059 |

(Continued)

*Primary Examiner* — Peter D Nolan
*Assistant Examiner* — Michael F Whalen
(74) *Attorney, Agent, or Firm* — JCIPRNET

(57) ABSTRACT

An unmanned aerial vehicle (UAV) control system and a UAV control method are provided. The UAV control method includes: storing a reporting configuration by a UAV; communicatively connecting to the UAV and storing at least one historical status information corresponding to the UAV by a server; reporting to the server at least one current status information according to the reporting configuration by the UAV; calculating a variance between the at least one historical status information and the at least one current status information by the server; and updating the reporting configuration of the UAV according to the variance by the server.

7 Claims, 2 Drawing Sheets

(56) References Cited

U.S. PATENT DOCUMENTS

| | | | | |
|---|---|---|---|---|
| 2002/0152042 A1* | 10/2002 | Waters | .................... | H04L 1/20 |
| | | | | 702/69 |
| 2010/0302359 A1* | 12/2010 | Adams | ................ | H04L 1/0017 |
| | | | | 375/240.01 |
| 2013/0211701 A1* | 8/2013 | Baker | ................ | G08G 5/0026 |
| | | | | 701/120 |
| 2013/0297103 A1* | 11/2013 | Baker | ................ | G08G 5/0013 |
| | | | | 701/14 |
| 2018/0082593 A1* | 3/2018 | Judd | .................... | G07C 5/008 |
| 2019/0180633 A1* | 6/2019 | Yoshizawa | ............. | B64C 39/02 |
| 2019/0327580 A1* | 10/2019 | Chang | ................ | H04W 4/025 |
| 2020/0264629 A1* | 8/2020 | Maveddat | ............ | G05D 1/0276 |
| 2020/0394926 A1* | 12/2020 | Naini | .................... | H04W 4/00 |
| 2022/0189276 A1* | 6/2022 | Manne | ................ | H04W 4/021 |

FOREIGN PATENT DOCUMENTS

| | | |
|---|---|---|
| TW | 201817647 | 5/2018 |
| TW | I657011 | 4/2019 |
| TW | I687111 | 3/2020 |

\* cited by examiner

UNMANNED AERIAL VEHICLE CONTROL SYSTEM AND UNMANNED AERIAL VEHICLE CONTROL METHOD

CROSS-REFERENCE TO RELATED APPLICATION

This application claims the priority benefit of Taiwan application serial no. 109128907, filed on Aug. 25, 2020. The entirety of the above-mentioned patent application is hereby incorporated by reference herein and made a part of this specification.

TECHNICAL FIELD

The invention relates to a control system and a control method, and more particularly, to an unmanned aerial vehicle control system and an unmanned aerial vehicle control method.

BACKGROUND

In recent years, many users have used mobile communication networks like fourth-generation mobile communication network (i.e., 4G network) or fifth-generation mobile communication network (i.e., 5G network) to control unmanned aerial vehicles to fly or send back video streaming data. However, the mobile communication network is aimed at electronic devices used on the ground, such as mobile phones, tablets or laptops. Relatively speaking, the unmanned aerial vehicles (UAVs) often fly at high places with poor mobile communication network. Therefore, the unmanned aerial vehicles often lose control or cannot send back the video streaming data in real time.

On the other hand, when executing a handover procedure, the unmanned aerial vehicle is prone to short-term connection interruption or signal delay, which can cause problems such as loss of transmission packets. In addition, there are many problems in the control of the unmanned aerial vehicle, such as: good quality mobile network on a flight route of the unmanned aerial vehicle being difficult to ensure; excessive power consumption or too much redundant information caused by reporting of messages from a regular and inflexible reporting mechanism; and too much duplicate data collected by the unmanned aerial vehicle due to the lack of consideration on factors like signal coverage or time; or problem regarding the fact that the unmanned aerial vehicle is unable to share collected data with other unmanned aerial vehicles.

SUMMARY

The invention provides an unmanned aerial vehicle control system and an unmanned aerial vehicle control method, which can automatically plan an appropriate timing for providing unmanned aerial vehicle status information, so that actions like controlling the unmanned aerial vehicle through mobile communication network or returning mobile video stream by the unmanned aerial vehicle can be executed stably.

An unmanned aerial vehicle control system of the invention includes an unmanned aerial vehicle and a server. The unmanned aerial vehicle stores a reporting configuration. The server communicatively connects to the unmanned aerial vehicle and stores at least one historical status information corresponding to the unmanned aerial vehicle. The unmanned aerial vehicle reports to the server at least one current status information according to the reporting configuration. The server calculates a variance between the at least one historical status information and the at least one current status information. The server updates the reporting configuration according to the variance.

In an embodiment of the invention, the server extends a reporting interval in the reporting configuration or reduces a number of reports per unit time in the reporting configuration in response to the variation being less than or equal to a first threshold.

In an embodiment of the invention, the server shortens a reporting interval in the reporting configuration or increases a number of reports per unit time in the reporting configuration in response to the variation being greater than or equal to a second threshold.

In an embodiment of the invention, the at least one current status information is associated with at least one of: a communication quality parameter, position information, a preset network type, a remaining power and a time stamp.

In an embodiment of the invention, the server shortens a reporting interval in the reporting configuration or increases a number of reports per unit time in the reporting configuration in response to the communication quality parameter being less than or equal to a communication quality threshold.

In an embodiment of the invention, the server shortens a reporting interval in the reporting configuration or increases a number of reports per unit time in the reporting configuration in response to the position information being in a preset area.

In an embodiment of the invention, the server extends a reporting interval in the reporting configuration or reduces a number of reports per unit time in the reporting configuration in response to the remaining power being less than or equal to a power threshold.

In an embodiment of the invention, the server shortens a reporting interval in the reporting configuration or increases a number of reports per unit time in the reporting configuration in response to the preset network type.

In an embodiment of the invention, the server generates a recommended route according to the at least one historical status information and the at least one current status information, and transmits the recommended route to the unmanned aerial vehicle.

An unmanned aerial vehicle control method of the invention is adapted to an unmanned aerial vehicle control system including an unmanned aerial vehicle and a server. The unmanned aerial vehicle control method includes: storing a reporting configuration by the unmanned aerial vehicle; communicatively connecting to the unmanned aerial vehicle and storing at least one historical status information corresponding to the unmanned aerial vehicle by the server; reporting to the server at least one current status information according to the reporting configuration by the unmanned aerial vehicle; calculating a variance between the at least one historical status information and the at least one current status information by the server; and updating the reporting configuration of the unmanned aerial vehicle according to the variance by the server.

Based on the above, the invention can appropriately configure the timing for the unmanned aerial vehicle to report. Accordingly, the unmanned aerial vehicle can operate stably at the lowest cost (e.g., energy cost), and the flight route of the unmanned aerial vehicle can be maintained in a location with good communication quality.

DESCRIPTION OF THE EMBODIMENTS

Figure 1:
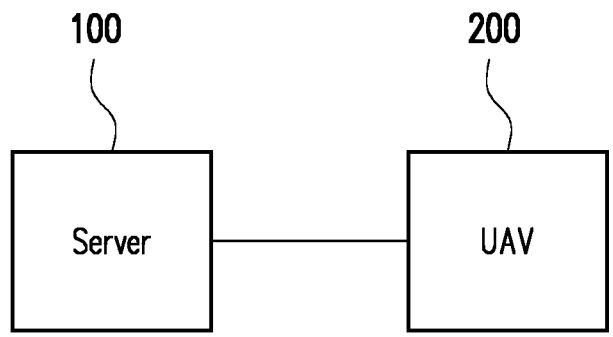
FIG. 1 is a schematic diagram illustrating an unmanned aerial vehicle control system according to an embodiment of the invention.

FIG. 1 is a schematic diagram illustrating an unmanned aerial vehicle control system 10 according to an embodiment of the invention. The unmanned aerial vehicle control system 10 may include a server 100 and an unmanned aerial vehicle (UAV) 200. The server 100 is, for example, a cloud server that can communicatively connect to the unmanned aerial vehicle 200 via a network (e.g., a mobile communication network), and control the unmanned aerial vehicle 200. For ease of description, FIG. 1 only shows one single unmanned aerial vehicle (i.e., the unmanned aerial vehicle 200), but the invention is not limited thereto. For example, in addition to the unmanned aerial vehicle 200, the unmanned aerial vehicle control system 10 may also include other unmanned aerial vehicles.

Figure 2:
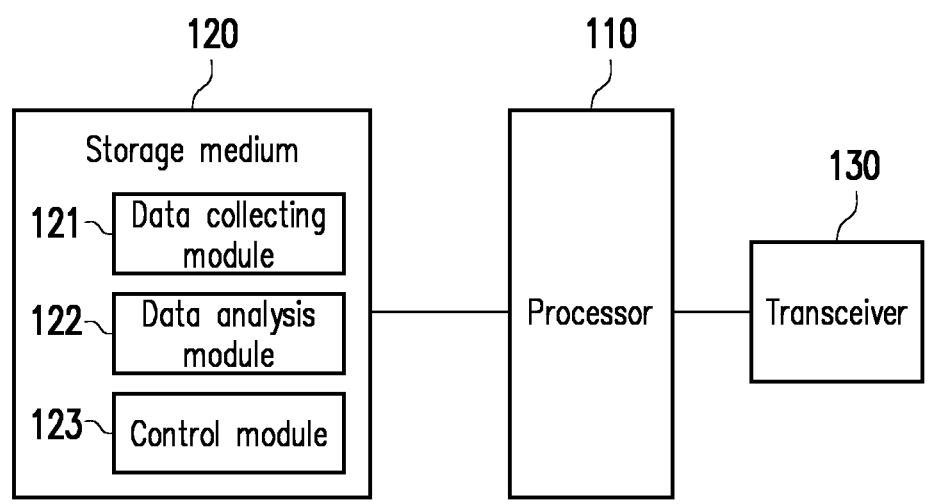
FIG. 2 is a schematic diagram illustrating a server according to an embodiment of the invention.

FIG. 2 is a schematic diagram illustrating the server 100 according to an embodiment of the invention. The server 100 may include a processor 110, a storage medium 120 and a transceiver 130.

The processor 110 is, for example, a central processing unit (CPU) or other programmable micro control units (MCU) for general purpose or special purpose, a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA) or other similar elements or a combination of above-mentioned elements. The processor 110 can be coupled to the storage medium 120 and the transceiver 130, and can access or execute a plurality of modules and various applications stored in the storage medium 120.

The storage medium 120 is, for example, a random access memory (RAM), a read-only memory (ROM), a flash memory, a hard disk drive (HDD), a hard disk drive (HDD), a solid state drive (SSD) or other similar elements in any stationary or movable form, or a combination of the above-mentioned elements, and is used to store the modules and various applications that may be executed by the processor 110. In this embodiment, the modules stored by the storage medium 120 may include a data collecting module 121, a data analysis module 122 and a control module 123, and their functions will be described later.

The transceiver 130 transmits and receives signals in a wired or wireless manner. The transceiver 130 can also perform operations such as low noise amplifying, impedance matching, frequency mixing, up and down frequency conversion, filtering, amplification and similar operations.

Figure 3:
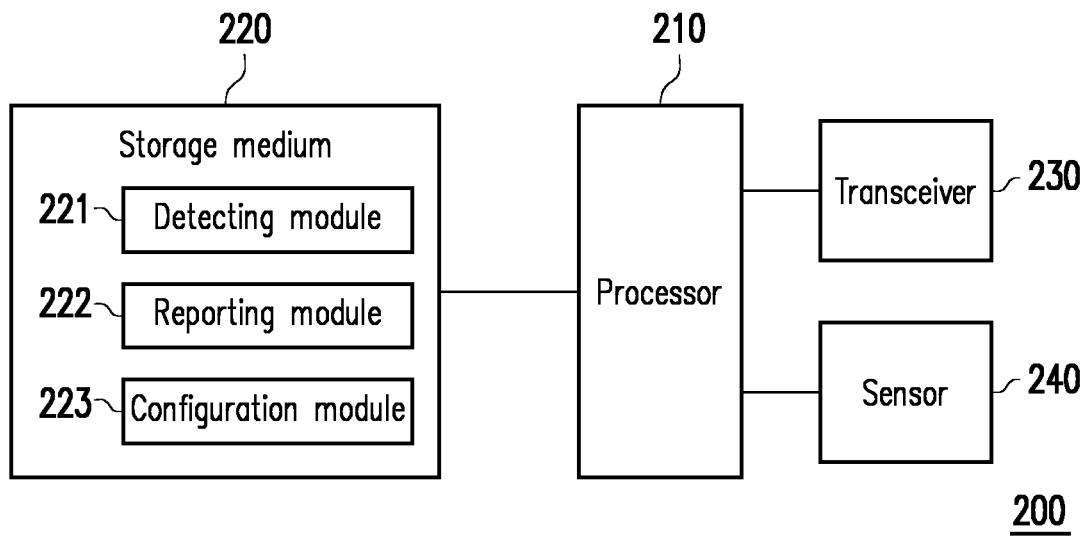
FIG. 3 is a schematic diagram illustrating an unmanned aerial vehicle according to an embodiment of the invention.

FIG. 3 is a schematic diagram illustrating the unmanned aerial vehicle 200 according to an embodiment of the invention. The unmanned aerial vehicle 200 may include a processor 210, a storage medium 220 and a transceiver 230. In an embodiment, the unmanned aerial vehicle 240 may further include a sensor 240.

The processor 210 is, for example, a central processing unit or other programmable micro control units for general purpose or special purpose, a microprocessor, a digital signal processor, a programmable controller, an application specific integrated circuit, a graphics processing unit, an image signal processor, an image processing unit, an arithmetic logic unit, a complex programmable logic device, a field programmable gate array or other similar elements or a combination of above-mentioned elements. The processor 210 can be coupled to the storage medium 220, the transceiver 230 and the sensor 240, and can access or execute a plurality of modules and various applications stored in the storage medium 220.

The storage medium 220 is, for example, a random access memory, a read-only memory, a flash memory, a hard disk drive, a hard disk drive, a solid state drive or other similar elements in any stationary or movable form, or a combination of the above-mentioned elements, and is used to store the modules and various applications that may be executed by the processor 210. In this embodiment, the modules stored by the storage medium 220 may include a detecting module 221, a reporting module 222 and a configuration module 223, and their functions will be described later.

The transceiver 230 transmits and receives signals in a wired or wireless manner. The transceiver 130 can also perform operations such as low noise amplifying, impedance matching, frequency mixing, up and down frequency conversion, filtering, amplification and similar operations.

The sensor 240 is configured to generate sensing data. Specifically, the detecting module 221 of the unmanned aerial vehicle 200 can sense an environment around the unmanned aerial vehicle 240 through the sensor 240 to generate the sensing data. The reporting module 222 of the unmanned aerial vehicle 200 can send the sensing data to the server 100 through the transceiver 230. For example, the sensor 240 may be a camcorder. The detecting module 221 can generate video stream data through the sensor 240. The reporting module 22 can send the video stream data to the server 100 through the transceiver 230. As another example, the sensor 240 may be a global positioning system (GPS) signal receiver. The detecting module 221 of the unmanned aerial vehicle 200 can receive a GPS signal through the sensor 240. The reporting module 222 can determine position information of the unmanned aerial vehicle 200 based on the GPS signal, and report the position information to the server 100 through the transceiver 230. The position information may include horizontal position information (e.g., latitude and longitude information of the unmanned aerial vehicle 200) or vertical position information (e.g., altitude information of the unmanned aerial vehicle 200).

The storage medium 220 of the unmanned aerial vehicle 200 can also store a reporting configuration. The reporting configuration includes information such as a reporting interval or a number of reports per unit time, but the invention is not limited thereto. The reporting module 222 of the unmanned aerial vehicle 200 can report status information (e.g., current status information or historical status information) according to the reporting configuration. For example, if the reporting interval is set to 30 seconds, the reporting module 222 can use the transceiver 230 to report the status information once every 30 seconds. As another example, if the number of reports per unit time is 3 times/minute, the reporting module 222 can report the status information three times within one minute through the transceiver 230. The status information may be associated with information such as an unmanned aerial vehicle identification code, a communication quality parameter, the position information, a preset network type, a remaining power or a time stamp, but the invention is not limited thereto. The status information is obtained by the detecting module 221 of the unmanned aerial vehicle 200, for example. For example, the detecting module 221 can measure the power of the unmanned aerial vehicle 200 to generate the remaining power. As another example, the detecting module 221 can determine the communication quality parameter, the preset network type or the time stamp through signals received by the transceiver 230. As yet another example, the detecting module 221 can determine the position information of the unmanned aerial vehicle 200 through the GPS signal received by the sensor 240.

It should be noted that, the current status information or the historical status information may be defined by users according to their needs. For example, the user may define the status information collected on the current day as the current status information, and the status information collected on the previous day as the historical status information, but the invention is not limited thereto.

The data collecting module 121 of the server 100 can receive the status information from the unmanned aerial vehicle 200 through the transceiver 130. The data collecting module 121 can store the status information reported by the unmanned aerial vehicle 200 as the historical status information in the storage medium 120. After the unmanned aerial vehicle 200 transmits the current status information to the server 100, the data analysis module 122 of the server 100 can determine how to configure a configuration of the unmanned aerial vehicle 200 according to the historical status information and the current status information corresponding to the unmanned aerial vehicle 200 The configuration may include, but is not limited to, the reporting configuration, a flight route, a flight altitude, a flight speed, or a relay charging station used in the flight route. After determining how to configure the configuration of the unmanned aerial vehicle 200, the control module 123 of the server 110 can send update information to the unmanned aerial vehicle 200 through the transceiver 130 to instruct the unmanned aerial vehicle 200 to update the configuration. According to the update information, the configuration module 223 of the unmanned aerial vehicle 200 can update the reporting configuration, the flight route, the flight altitude, the flight speed, or the relay charging station used in the flight route.

The data analysis module 122 of the server 100 can calculate a variation between the historical status information and the current status information reported by the unmanned aerial vehicle 200. The variation includes, for example, a variation on information such as the communication quality parameter, the position information, the preset network type, the remaining power or the time stamp, but the invention is not limited thereto. The control module 123 of the server 100 can update the reporting configuration of the unmanned aerial vehicle 200 according to the variation.

In an embodiment, if the variation is less than or equal to a threshold, the control module 123 can send the update information to the unmanned aerial vehicle 200 through the transceiver 130 to instruct the unmanned aerial vehicle 200 to update the reporting configuration according to the update information. For example, the update information can instruct the unmanned aerial vehicle 200 to extend the reporting interval in the reporting configuration or reduce the number of reports per unit time in the reporting configuration. In other words, if the behavior of the unmanned aerial vehicle 200 does not change significantly within a certain period of time, the server 100 can reduce the frequency of reporting the status information by the unmanned aerial vehicle 200, so as to reduce the power consumed by the unmanned aerial vehicle 200 or prevent the unmanned aerial vehicle 200 from sending too much redundant data (e.g., duplicate data) to the server 100. In another embodiment, if the variation is less than or equal to a threshold, the control module 123 can instruct the unmanned aerial vehicle 200 to shorten the reporting interval in the reporting configuration or increase the number of reports per unit time in the reporting configuration through the update information.

In an embodiment, if the variation is greater than a threshold, the control module 123 can send the update information to the unmanned aerial vehicle through the transceiver 130 to instruct the unmanned aerial vehicle 200 to update the reporting configuration according to the update information. For example, the update information can instruct the unmanned aerial vehicle 200 to shorten the reporting interval in the reporting configuration or increase the number of reports per unit time in the reporting configuration. In other words, if the behavior of the unmanned aerial vehicle 200 changes significantly within a certain period of time, the server 100 can increase the frequency of reporting the status information by the unmanned aerial vehicle 200, so as to quickly keep track of the status of the unmanned aerial vehicle 200. In another embodiment, if the variation is greater than a threshold, the control module 123 can instruct the unmanned aerial vehicle 200 to extend the reporting interval in the reporting configuration or to reduce the number of reports per unit time in the reporting configuration through the update information.

In an embodiment, if the variance between the communication quality parameter in the historical status information and the communication quality parameter in the current status information reported by the unmanned aerial vehicle 200 is greater than a threshold of the communication quality parameter, the data analysis module 122 of the server 100 can determine that the communication quality parameter of the unmanned aerial vehicle 200 is significantly reduced or improved according to the variation. If the communication quality parameter is significantly improved, the control module 123 of the server 100 can extend the reporting interval in the reporting configuration or reduce the number of reports per unit time in the reporting configuration. In other words, when the unmanned aerial vehicle 200 is in an environment with good communication quality, the frequency of reporting the status information by the reporting module 222 of the unmanned aerial vehicle 200 may be reduced. In this way, the power consumed by the unmanned aerial vehicle 200 may be reduced or the unmanned aerial vehicle 200 may be prevented from transmitting excessive redundant data to the server 100. On the other hand, if the communication quality parameter is significantly reduced, the control module 123 of the server 100 can shorten the reporting interval in the reporting configuration or increase the number of reports per unit time in the reporting configuration. In other words, when the unmanned aerial vehicle 200 is in an environment with poor communication quality, the frequency of reporting the status information by the reporting module 222 of the unmanned aerial vehicle 200 may be increased. In this way, it can be avoided that the unmanned aerial vehicle 200 cannot smoothly report the data collected by the unmanned aerial vehicle 200 to the server 100 due to factors such as packet loss.

In an embodiment, if the variation between the position information in the historical status information and the position information in the current status information reported by the unmanned aerial vehicle 200 is greater than a threshold of the position information, the data analysis module 122 of the server 100 can determine that the unmanned aerial vehicle 200 has moved a certain distance according to the variation. Accordingly, the control module 123 can shorten the reporting interval in the reporting configuration or increase the number of reports per unit time in the reporting configuration, so that the server 100 can quickly keep track of the position information of the unmanned aerial vehicle 200.

In an embodiment, if the variance between the preset network type in the historical status information and the preset network type in the current status information reported by the unmanned aerial vehicle 200 is greater than a threshold of the preset network type, the data analysis module 122 of the server 100 can determine the current default network type the unmanned aerial vehicle 200 according to the variation. The control module 123 can configure the reporting configuration of the unmanned aerial vehicle 200 according to the preset network type. For example, the unmanned aerial vehicles 200 using different preset network types can be configured with different reporting configurations. The preset network type may include, for example, the fourth-generation mobile communication network or the fifth-generation mobile communication network, and the invention is not limited thereto. Accordingly, the reporting configuration configured for the unmanned aerial vehicle 200 using the fourth-generation mobile communication network may be different from the reporting configuration configured for the unmanned aerial vehicle 200 using the fifth-generation mobile communication network.

In an embodiment, if the variation between the remaining power in the historical status information and the remaining power in the current status information reported by the unmanned aerial vehicle 200 is greater than a threshold of the power, the data analysis module 122 of the server 100 can determine that the power consumed by the unmanned aerial vehicle 200 is too high according to the variation. Accordingly, the control module 123 of the server 100 can extend the reporting interval in the reporting configuration or reduce the number of reports per unit time in the reporting configuration, so as to reduce the power consumed by the unmanned aerial vehicle 200.

In an embodiment, if the variation between the time stamp in the historical status information and the time stamp in the current status information reported by the unmanned aerial vehicle 200 is greater than a threshold of the time stamp, the data analysis module 122 of the server 100 can determine that the number of reports per unit time of the unmanned aerial vehicle 200 is probably reduced according to the variation. In other words, some of the status information reported by the unmanned aerial vehicle 200 may not be successfully received by the server 100 due to factors such as packet loss. Accordingly, the control module 123 of the server 100 can shorten the reporting interval in the reporting configuration or increase the number of reports per unit time in the reporting configuration.

In addition to the server 100 determining whether to update the reporting configuration of the unmanned aerial vehicle 200 according to the historical status information and the amount of variation between the current status information, whether to update the reporting configuration may also be determined according to an event by the server 100 or the unmanned aerial vehicle 200.

In an embodiment, the data analysis module 122 of the server 100 or the configuration module 223 of the unmanned aerial vehicle 200 can shorten the reporting interval in the reporting configuration or increase the number of reports per unit time in the reporting configuration in response to the communication quality parameter in the current status information reported by the unmanned aerial vehicle 200 being less than or equal to a threshold of the communication quality. The communication quality parameter may include, but are not limited to, a radio resource management (RRM) parameter, a signal-to-interference-plus-noise (SINR) or a measurement time. The RRM parameter may include, but are not limited to, a receiving signal strength indicator (RSSI), a channel quality indicator (CQI), a reference signal received power (RSRP), or a reference signal received quality (RSRQ).

In an embodiment, the data analysis module 122 of the server 100 or the configuration module 223 of the unmanned aerial vehicle 200 can shorten the reporting interval in the reporting configuration or increase the number of reports per unit time in the reporting configuration in response to the position information in the current status information reported by the unmanned aerial vehicle 200 indicating that the unmanned aerial vehicle 200 is in a preset area (e.g., an area far from a base station and having poor communication quality or corresponding to less historical status data), so as to improve a communication reliability of the unmanned aerial vehicle 200. In another embodiment, the data analysis module 122 of the server 100 or the configuration module 223 of the unmanned aerial vehicle 200 can extend the reporting interval in the reporting configuration or reduce the number of reports per unit time in the reporting configuration in response to the position information in the current status information reported by the unmanned aerial vehicle 200 indicating that the unmanned aerial vehicle 200 is in a preset area (e.g., an area close to a base station and having good communication quality), so as to reduce the power consumption of the unmanned aerial vehicle 200 or reduce the probability of receiving redundant data from the unmanned aerial vehicle 200.

In another embodiment, the data analysis module 122 of the server 100 or the configuration module 223 of the unmanned aerial vehicle 200 can extend the reporting interval in the reporting configuration or reduce the number of reports per unit time in the reporting configuration in response to the remaining power in the current status information reported by the unmanned aerial vehicle 200 being less than or equal to a power threshold, so as to reduce the power consumption of the unmanned aerial vehicle 200.

In an embodiment, the data analysis module 122 of the server 100 can generate a recommended route according to the historical status information and/or the current status information reported by the unmanned aerial vehicle 200. The control module 123 of the server 100 can transmit the recommended route to the unmanned aerial vehicle 200 through the transceiver 130 to instruct the unmanned aerial vehicle 200 to fly according to the recommended route.

In an embodiment, information received by the server 100 from the unmanned aerial vehicle 200 or information generated according to the historical status information and/or the current status information reported by the unmanned aerial vehicle 200 (e.g., the communication quality parameter, the recommended route, or the update information for updating the reporting configuration) may be sent to other unmanned aerial vehicles. For example, the data collecting module 122 can determine that a flight route or a function of a second unmanned aerial vehicle is similar to those of the unmanned aerial vehicle 200 according to information reported by the second unmanned aerial vehicle. Accordingly, the control module 123 can transmit the information generated according to the historical status information and/or current status information reported by the unmanned aerial vehicle 200 to the second unmanned aerial vehicle through the transceiver 130. In other words, the server 100 can configure and manage one or more unmanned aerial vehicles that are communicatively connected to the server 100 according to the big data collected from multiple unmanned aerial vehicles.

Figure 4:
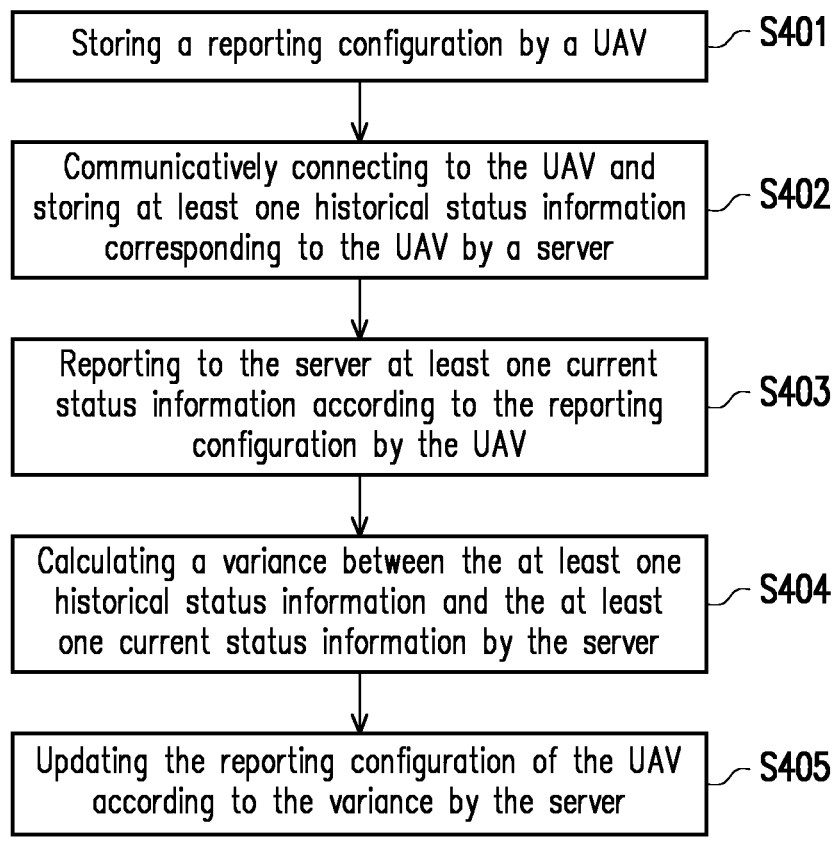
FIG. 4 is a flowchart illustrating an unmanned aerial vehicle control method according to an embodiment of the invention.

FIG. 4 is a flowchart illustrating an unmanned aerial vehicle control method according to an embodiment of the invention. Here, the unmanned aerial vehicle control method may be implemented by unmanned aerial vehicle 10 shown in FIG. 1. In step S401, an unmanned aerial vehicle stores a reporting configuration. In step S402, a server communicatively connects to the unmanned aerial vehicle and stores at least one historical status information corresponding to the unmanned aerial vehicle. In step S403, the unmanned aerial vehicle reports to the server at least one current status information according to the reporting configuration. In step S404, the server calculates a variance between the at least one historical status information and the at least one current status information. In step S405, the server updates the reporting configuration of the unmanned aerial vehicle according to the variance.

In summary, the invention can automatically configure the timing for the unmanned aerial vehicle to report according to the status information of the unmanned aerial vehicle. The invention can configure the reporting configuration of the unmanned aerial vehicle according to a quality of the mobile network or a movement trajectory of the unmanned aerial vehicle, so as to prevent the server from being unable to correct the route of the unmanned aerial vehicle in real time because the frequency of reporting by the unmanned aerial vehicle (or the number of reports) is too low, or prevent excessive power consumption or excessive redundant data generation because the frequency of reporting by the unmanned aerial vehicle (or the number of reports) is too high. By appropriately updating the reporting configuration of the unmanned aerial vehicle, the invention can allow the unmanned aerial vehicle to operate stably at the lowest cost (e.g., energy cost), and maintain the flight route of the unmanned aerial vehicle in a location with good communication quality. In addition, the server can also share the configured reporting configuration with other unmanned aerial vehicles. When the unmanned aerial vehicle encounters a specific situation (e.g., insufficient battery), the unmanned aerial vehicle can report the same in real time. The server can instruct the next action of the unmanned aerial vehicle according to the report of the unmanned aerial vehicle. In this way, the flight of the unmanned aerial vehicle can be prevented from being affected by emergencies.

What is claimed is:

1. An unmanned aerial vehicle control system, comprising:
    an unmanned aerial vehicle, storing a reporting configuration; and
    a server, communicatively connecting to the unmanned aerial vehicle and storing at least one historical status information corresponding to the unmanned aerial vehicle, wherein
    the unmanned aerial vehicle reports to the server at least one current status information according to the reporting configuration;
    the server calculates a variance between the at least one historical status information and the at least one current status information, wherein the variance is associated with a communication quality parameter, position information, a preset network type, a remaining power, and a time stamp; and
    the server updates the reporting configuration of the unmanned aerial vehicle according to the variance, wherein
    the server extends a reporting interval in the reporting configuration or reduces a number of reports per unit time in the reporting configuration in response to the variation being less than or equal to a first threshold, and
    the server shortens a reporting interval in the reporting configuration or increases a number of reports per unit time in the reporting configuration in response to the variation being greater than or equal to a second threshold, wherein the first variance threshold is different from the second variance threshold.

2. The unmanned aerial vehicle control system of claim 1, wherein the server shortens a reporting interval in the reporting configuration or increases a number of reports per unit time in the reporting configuration in response to the communication quality parameter being less than or equal to a communication quality threshold.

3. The unmanned aerial vehicle control system of claim 1, wherein the server shortens a reporting interval in the reporting configuration or increases a number of reports per unit time in the reporting configuration in response to the position information being in a preset area.

4. The unmanned aerial vehicle control system of claim 1, wherein the server extends a reporting interval in the reporting configuration or reduces a number of reports per unit time in the reporting configuration in response to the remaining power being less than or equal to a power threshold.

5. The unmanned aerial vehicle control system of claim 1, wherein the server shortens a reporting interval in the reporting configuration or increases a number of reports per unit time in the reporting configuration in response to the preset network type.

6. The unmanned aerial vehicle control system of claim 1, wherein the server generates a recommended route according to the at least one historical status information and the at least one current status information, and transmits the recommended route to the unmanned aerial vehicle.

7. An unmanned aerial vehicle control method, adapted to an unmanned aerial vehicle control system including an unmanned aerial vehicle and a server, wherein the unmanned aerial vehicle control method comprises:
    storing a reporting configuration by the unmanned aerial vehicle;
    communicatively connecting to the unmanned aerial vehicle and storing at least one historical status information corresponding to the unmanned aerial vehicle by the server;
    reporting to the server at least one current status information according to the reporting configuration by the unmanned aerial vehicle;
    calculating a variance between the at least one historical status information and the at least one current status information by the server, wherein the variance is associated with a communication quality parameter, position information, a preset network type, a remaining power, and a time stamp; and updating the reporting configuration of the unmanned aerial vehicle according to the variance by the server, wherein the server extends a reporting interval in the reporting configuration or reduces a number of reports per unit time in the reporting configuration in response to the variation being less than or equal to a first threshold, and the server shortens a reporting interval in the reporting configuration or increases a number of reports per unit time in the reporting configuration in response to the variation being greater than or equal to a second threshold, wherein the first variance threshold is different from the second variance threshold.

* * * * *